US009857847B2

(12) United States Patent
Lim et al.

(10) Patent No.: US 9,857,847 B2
(45) Date of Patent: Jan. 2, 2018

(54) COLLAPSIBLE HINGE ASSEMBLY

(71) Applicant: HEWLETT-PACKARD DEVELOPMENT COMPANY, L.P., Houston, TX (US)

(72) Inventors: Hui-Leng Lim, Houston, TX (US); Chan-Woo Park, Houston, TX (US); Hui He, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/112,505

(22) PCT Filed: Mar. 28, 2014

(86) PCT No.: PCT/US2014/032100
§ 371 (c)(1),
(2) Date: Jul. 19, 2016

(87) PCT Pub. No.: WO2015/147845
PCT Pub. Date: Oct. 1, 2015

(65) Prior Publication Data
US 2017/0115703 A1 Apr. 27, 2017

(51) Int. Cl.
*G06F 1/16* (2006.01)
(52) U.S. Cl.
CPC .......... *G06F 1/1681* (2013.01); *G06F 1/1616* (2013.01); *G06F 1/1637* (2013.01); *G06F 1/1679* (2013.01)
(58) Field of Classification Search
CPC .... G06F 1/1616; G06F 1/1637; G06F 1/1681; G06F 1/162
See application file for complete search history.

(56) References Cited

U.S. PATENT DOCUMENTS

| | | | | |
|---|---|---|---|---|
| 6,829,140 B2 * | 12/2004 | Shimano | ................. | G06F 1/162 248/919 |
| 6,903,927 B2 * | 6/2005 | Anlauff | .................... | G06F 1/162 341/22 |
| 6,980,423 B2 * | 12/2005 | Tanaka | .................... | G06F 1/162 248/917 |
| 7,184,263 B1 * | 2/2007 | Maskatia | .............. | G06F 1/1616 248/917 |
| 7,239,505 B2 | 7/2007 | Keely et al. | | |
| 7,403,378 B2 * | 7/2008 | Lo | ........................... | G06F 1/162 341/21 |

(Continued)

FOREIGN PATENT DOCUMENTS

KR 20-2012-0006942 10/2012

OTHER PUBLICATIONS

Mike, S; "Lenovo Introduces Convertible Thinkpad Yoga 11e Chromebook for Education Market"; Feb. 2, 2014; 3 pages.

(Continued)

*Primary Examiner* — Adrian S Wilson
(74) *Attorney, Agent, or Firm* — HP Inc Patent Department

(57) ABSTRACT

Implementations of the present disclosure disclose a collapsible hinge assembly for a portable electronic device. According to one implementation, a base member including a hinge side is connected to a carbon fiber sheet at a first end. The carbon fiber sheet includes a collapsible region. Moreover, a display device is connected to the carbon fiber sheet along a front surface thereof.

13 Claims, 3 Drawing Sheets

(56) References Cited

U.S. PATENT DOCUMENTS

| | | | | |
|---|---|---|---|---|
| 7,652,873 B2* | 1/2010 | Lee | ............ | E05B 65/006 248/917 |
| 8,724,312 B2 | 5/2014 | Jones et al. | | |
| 8,917,498 B2* | 12/2014 | Mai | ............ | G06F 1/1616 361/679.02 |
| 8,988,354 B2* | 3/2015 | Milhe | ............ | G06F 1/1671 345/168 |
| 8,988,863 B2* | 3/2015 | Hung | ............ | G06F 1/1601 248/917 |
| 9,149,100 B2* | 10/2015 | Marshall | ............ | A45C 11/00 |
| 2005/0052831 A1* | 3/2005 | Chen | ............ | G06F 1/1616 361/679.11 |
| 2006/0187626 A1 | 8/2006 | Ditzik | | |
| 2006/0211457 A1* | 9/2006 | Otsuka | ............ | G06F 1/162 455/575.1 |
| 2012/0168590 A1* | 7/2012 | Yang | ............ | F16M 11/10 248/346.3 |
| 2012/0206868 A1 | 8/2012 | Kawamoto et al. | | |
| 2012/0325999 A1* | 12/2012 | Yang | ............ | F16M 11/10 248/371 |
| 2013/0031289 A1* | 1/2013 | Yeh | ............ | G06F 1/1632 710/303 |
| 2013/0083465 A1* | 4/2013 | Motoishi | ............ | G06F 1/1613 361/679.21 |
| 2013/0083496 A1 | 4/2013 | Franklin et al. | | |
| 2013/0100055 A1* | 4/2013 | Lauder | ............ | G06F 1/1626 345/173 |
| 2013/0170125 A1* | 7/2013 | Liang | ............ | H05K 5/0086 361/679.09 |
| 2013/0314859 A1* | 11/2013 | Huang | ............ | H05K 7/02 361/679.01 |
| 2014/0036429 A1 | 2/2014 | Bryan et al. | | |
| 2014/0049891 A1* | 2/2014 | Lee | ............ | G06F 1/1637 361/679.15 |
| 2014/0063712 A1* | 3/2014 | Chung | ............ | G06F 1/1615 361/679.09 |
| 2014/0092540 A1* | 4/2014 | Hung | ............ | G06F 1/1601 361/679.05 |
| 2014/0157546 A1* | 6/2014 | Ho | ............ | E05D 7/00 16/221 |
| 2014/0293525 A1* | 10/2014 | Tomita | ............ | G06F 1/1637 361/679.06 |
| 2014/0321038 A1* | 10/2014 | Park | ............ | G06F 1/1681 361/679.09 |
| 2014/0340829 A1* | 11/2014 | Matsumoto | ............ | G06F 1/1616 361/679.27 |

OTHER PUBLICATIONS

Schardein, S.; "Review Lenovo Thinkpad Twist Convertible Ultrabook"; Dec. 12, 2012; 10 pages.

Thetechpanda; "New Laptops Flood the Market Before Microsoft Windows 8 Official Launch"; Oct. 10, 2012; 12 pages.

* cited by examiner

COLLAPSIBLE HINGE ASSEMBLY

BACKGROUND

The emergence and popularity of mobile computing has made portable electronic devices, due to their compact design and light weight, a staple in today's marketplace. Within the mobile computing realm, notebook computers are one of the most-widely used devices and generally employ a clam-shell type design consisting of two housings connected together at a common end via a hinge for example. In most cases, a first or display housing is utilized to provide a viewable display to a user while a second housing includes an area for user input (e.g., touchpad and keyboard). Furthermore, convertible notebook computers typically include a base housing for enabling standard input (e.g., keyboard) along with an attached touchscreen display housing for accepting user input and displaying images to an operating user. Such notebooks further include a hinge mechanism used to facilitate movement and articulation of the display housing along a common axis.

BRIEF DESCRIPTION OF THE DRAWINGS

The features and advantages of the present disclosure as well as additional features and advantages thereof will be more clearly understood hereinafter as a result of a detailed description of implementations when taken in conjunction with the following drawings in which.

DETAILED DESCRIPTION OF THE INVENTION

Figure 1:
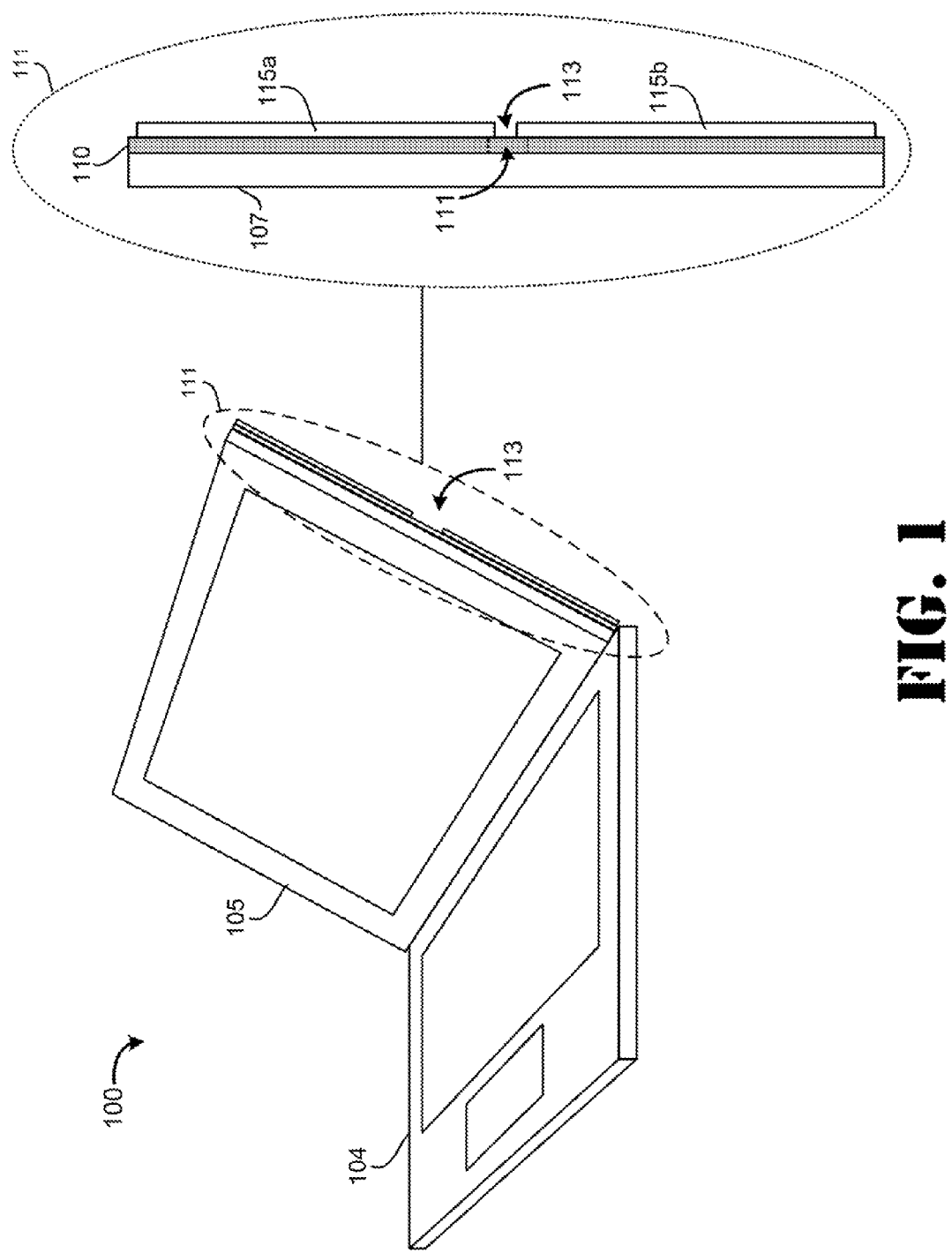
FIG. 1 illustrates a three-dimensional perspective view of a notebook computer including a collapsible hinge assembly according to an example implementation.

The following discussion is directed to various examples. Although one or more of these examples may be discussed in detail, the implementations disclosed should not be interpreted, or otherwise used, as limiting the scope of the disclosure, including the claims. In addition, one skilled in the art will understand that the following description has broad application, and the discussion of any implementations is meant only to be an example of one implementation, and not intended to intimate that the scope of the disclosure. Including the claims, is limited to that implementation. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

The hinge of a clam-shell computing device, such as those found on notebook and hybrid computing systems for example, are important for allowing quick and easy transition of the device from a closed position to an input operating mode. Manufactures and users alike desire a notebook that allows for multiple positioning. Prior solutions include a large cutout on the back of the panel housing for allowing full clearance of the hinge when the display housing is completed rotated. Other solutions further include hard stops formed onto pivot points to prevent articulation of the housing past a certain point. However, each of these solutions are unable provide a hinge mechanism configured to easily transition the display housing from a notebook viewing mode to a tablet operating mode.

Examples described herein provide a carbon fiber hinge assembly for a portable electronic device. According to one example, the hinge assembly includes a carbon fiber layer coupled to an end of the base housing and to the display module along a first surface. When in a tablet operating mode, the carbon fiber layer is capable of being bent along a central region such that the viewing surface of the display faces and the user and the upper housing lies substantially parallel with the base housing.

Referring now in more detail to the drawings in which like numerals identify corresponding parts throughout the views, FIG. 1 illustrates a three-dimensional perspective view of a notebook computer including a collapsible hinge assembly according to an example implementation. As shown here, the mechanical system of the present disclosure includes a notebook computer 100 having a base housing 104 and an adjustable display housing assembly 105. In one implementation, the display housing 105 includes a touch-enabled liquid crystal display (LCD) module 107 or the like, as well as other possible elements including a web camera, speakers, and antennas for example. However, the display housing 105 may also use a non-touch LCD module as well. In some implementations, the display housing 105 includes the main system electrical printed circuit board while the base housing 104 contains a keyboard and basic I/O ports and functionality. In one example, the display panel 107 is assembled into an outer enclosure frame, which could be comprise of material such as magnesium, aluminum, or plastic.

The unidirectional carbon fiber hinge sheet 110 represents a composite material of carbon fiber formed in one direction and having at least one collapsible or foldable region 111 (central or other area). The carbon fiber hinge sheet 110 can be used as partial element of the display housing frame (in which the frame is connected therewith) or represent the entire panel housing frame which surrounds the display module. As shown in the enlarged view 111 of FIG. 1, the carbon fiber display assembly 105 includes a carbon fiber layer 110 coupled to a display module 107 on a front surface, while a pair of outer enclosure members 115*a* and 115*b* are formed along a rear surface (opposite the front surface) of the carbon fiber layer 110. The carbon fiber layer 110 may represent a unidirectional carbon fiber sheet or multi-layered laminated carbon fiber structure capable of being bent and folded onto itself as will be described in further detail below. Though examples describe a carbon fiber material, any rigid and sufficiently flexible thermoplastic or similar material may be utilized to achieve the implementations described herein. The outer enclosure members 115a and 115b may be comprised of metal or plastic and serve to protect the carbon fiber sheet 110 and display module 107 from external damage. And in accordance with one example, the panel assembly 105 includes a cosmetic split area 113, which corresponds with the collapsible region 111 of the carbon fiber layer 110, and represents a separation gap in the positioning of the pair of outer enclosure members 115a and 115b along the rear surface of the carbon fiber layer 110.

Figure 2A:
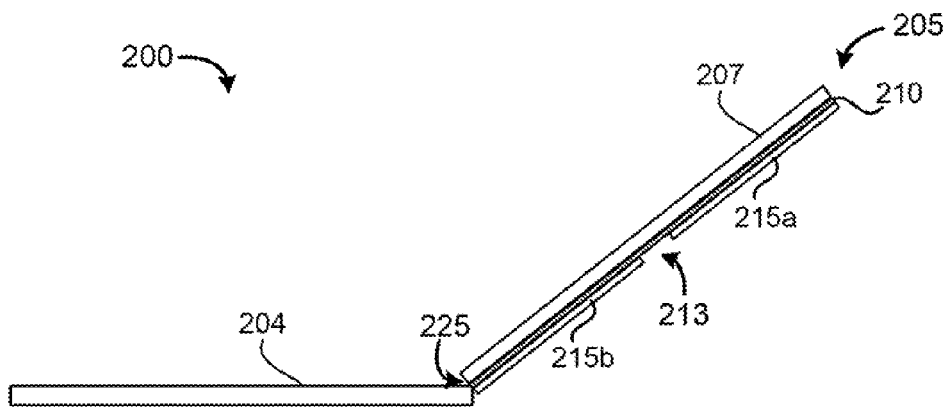
FIGS. 2A-2C illustrates a side profile view of a notebook computer and movement of the collapsible hinge assembly according to an example implementation.
Figure 2B:
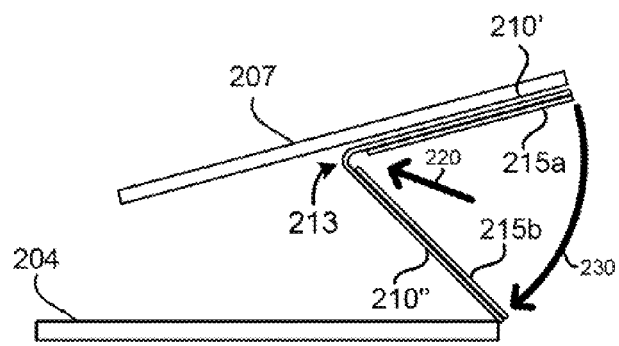
Figure 2C:
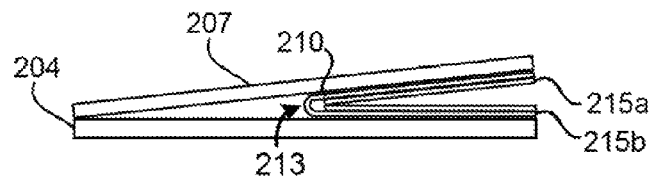

FIGS. 2A-2C illustrates a side profile view of a notebook computer and movement of the Collapsible hinge assembly according to an example implementation. FIG. 2A depicts the portable electronic device 200 in a notebook operating mode. As shown here, when in the notebook mode, the panel assembly 205 is positioned away from the base housing 204 via the unidirectional carbon fiber layer 210, which is connected to the base housing 204 at a common end 225 and serves as a hinge mechanism for facilitating movement of the housing assembly 205 from a first viewing position to a second viewing position.

FIG. 2B depicts initial movement of the panel housing 205 from the notebook operating mode to the tablet operating mode. As shown, inward external force (as indicated by directional arrow 220) from the rear of the panel assembly 205 causes the carbon fiber hinge sheet 210 to collapse and bend along its foldable or collapsible region, which corresponds with gap area 213, such that the lower surface 210" of the carbon fiber sheet 210 moves away (e.g., disengages if attached) from a display module 207 while the upper surface 210' of the carbon fiber sheet remains attached to the display module 207. When in the notebook mode, the lower surface 210" of the carbon finger sheet 210 may be unattached or loosely attached to a corresponding area of the display module 207 via an adhesive material for example. Moreover, the upper surface 210' of the carbon fiber layer collapses as it moves further downward (as indicated by directional arrow 230) until the lower surface 210" of the carbon fiber sheet 210" is immediately adjacent to the base housing 204 as shown in FIG. 20.

When in the tablet operating mode depicted in FIG. 2C, the carbon fiber panel assembly 205 is substantially parallel with the base housing 204 of the computing device. As shown, the unidirectional carbon fiber sheet 210 is folded nearly in half such that the outer enclosure members 215a and 215b abut one another near the gap area 213. Furthermore, the upper 210' and lower 210" surfaces of the carbon fiber sheet are nearly parallel with each other and angled with respect to each other in a similar manner as the base housing 204 and panel housing 205. In one example, the upper surface 210' is slightly inclined with respect to the normal surface. Accordingly, the display module 207, which remains connected with the upper surface 210' of the carbon fiber sheet, is substantially parallel to the base housing 204 and abuts the base housing 204 at a front end opposite the common end (end connected with carbon fiber sheet 210) of the base housing 204 when in a fully-reclined tablet operating position.

Figure 3A:
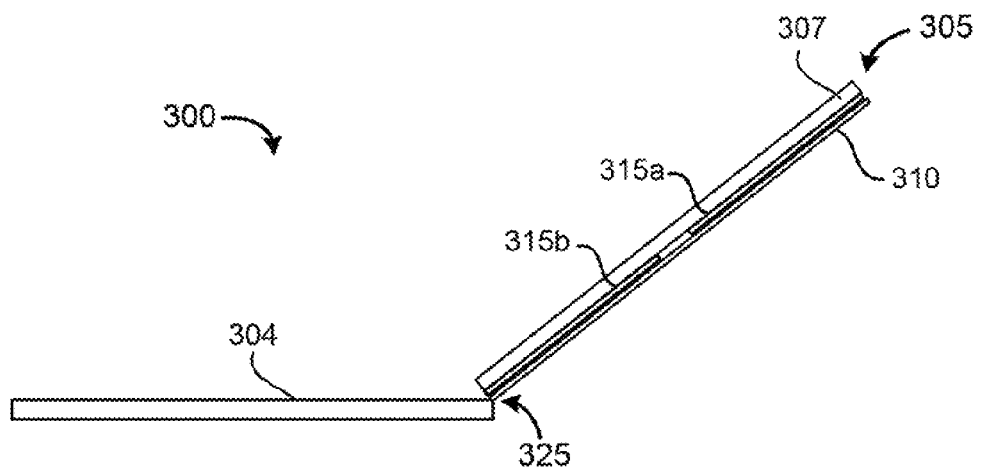
FIGS. 3A-3C illustrates a side profile view of another embodiment of a notebook computer and movement of the collapsible hinge assembly according to an example implementation.
Figure 3B:
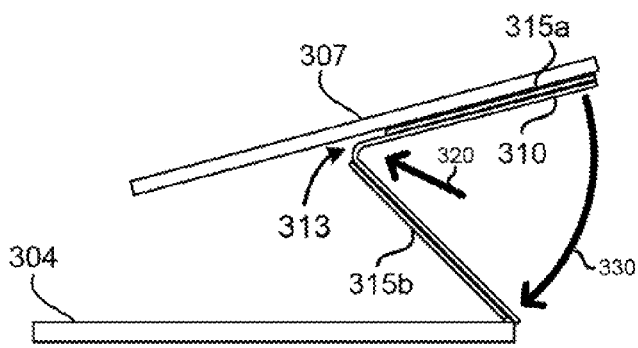
Figure 3C:
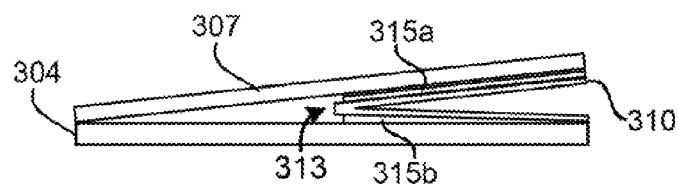

FIGS. 3A-3C illustrates a side profile view of another embodiment of a notebook computer and movement of the collapsible hinge assembly according to an example implementation. Here, the carbon fiber hinge assembly comprises of a plurality of laminated carbon fiber sheets. For instance, a pair of multi-layered carbon fiber sheets 315a and 315b are connected to a display device 307 on a first side and further laminated with a unidirectional carbon fiber sheet 310 on a second side opposite the first side. The multi-layered carbon fiber structure may represent a plurality of bonded sheets including CF stacks 315a and 315b laminated with the carbon fiber sheet 310. For example, the CF stacks 315a and 315b may represent a carbon fiber composite of laminated sheets including a polycarbonate core sheet and multiple carbon fiber sheets.

FIG. 3A depicts the portable electronic device 300 in a notebook operating mode. As in previous example, when in the notebook mode, the panel assembly 305 is positioned away from the base housing 304 via the unidirectional carbon fiber layer 310, which is connected to the base housing 304 at a common end 325 and still serves as a hinge mechanism for facilitating movement of the housing assembly 305 from a first viewing position to a second viewing position. However, the present example does not include the exposed cosmetic split or gap area as in the previous implementation.

FIG. 3B depicts movement of the panel housing 305 from the notebook operating mode to the tablet operating mode. As shown, inward external force (as indicated by directional arrow 320) from the rear of the panel assembly 305 causes the unidirectional carbon fiber hinge sheet 310 to bend along its collapsible region (corresponding with inner gap area 313 formed from the positioning of the upper CF layer stack 315a and lower CF layer stack 315b). Consequently, the lower CF stack layer 315b disengages from a display device 307 while the upper CF stack 315a remains attached to the display device 307. Moreover, the rear surfaces of the laminated unidirectional carbon fiber sheet 310 collapse and fold further (as indicated by directional arrow 330) until the lower CF stack 315b is immediately adjacent to the base housing 304 as shown in FIG. 3C.

When in the tablet operating mode depicted in FIG. 3C, the carbon fiber panel assembly 305 is substantially parallel with the base housing 304 of the computing device. As shown, the unidirectional carbon fiber sheet 310 is folded nearly in half along the gap area 313 such that the upper CF layer stack 315a and lower CF layer stack 315b are nearly parallel with one another other. In one example, the upper CF layer stack 315a is slightly inclined with respect to the normal surface. Accordingly, the display module 307, which remains connected with the upper CF layer stack 315a, is substantially parallel to the base housing 304 and abuts the base housing 304 at a front end opposite the common end (end connected with carbon fiber sheet 310) of the base housing 304 when in the fully-reclined tablet operating position.

Implementations of the present disclosure provide a collapsible hinge assembly for a portable electronic device. Moreover, many advantages are afforded by the implementations of the present examples. For instance, implementations described herein allow the end user to adjust the panel housing in infinite positions with respect to the base housing so as to produce the most desirable viewing angle for the user. Moreover, utilizing the flexible unidirectional carbon fiber layer allows the panel housing to nearly fold back on itself without damaging the housings, thus providing a near flat tablet-like orientation (e.g., 180° rotation). Furthermore, the present configuration allow for a thinner and more robust panel and hinge assembly than traditional rubberized panels. Additionally, integrated design described herein eliminates the seam line of prior solutions and provides a lighter and stronger hinge assembly.

Furthermore, while the disclosure has been described with respect to particular examples, one skilled in the art will recognize that numerous modifications are possible. For instance, although examples described herein depict a notebook computer as the portable electronic device, the disclosure is not limited thereto. For example, the portable electronic device may be a netbook, multimedia player, monitor, cell phone, smart phone, or any other electronic device having a clam-shell housing arrangement.

Moreover, not all components, features, structures, characteristics, etc. described and illustrated herein need be included in a particular example or implementation. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element. It is to be noted that, although some examples have been described in reference to particular implementations, other implementations are possible according to some examples. Additionally, the arrangement o order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A computing device having a collapsible hinge assembly comprising:
 a base member including a hinge side;
 a carbon fiber sheet having a collapsible region and connected to the hinge side of the base member at a first end, wherein the carbon fiber sheet includes a front, surface and a rear surface;
 a display device connected to the carbon fiber sheet along the front surface; and
 a pair of outer enclosure members formed on a rear surface of the carbon fiber sheet opposite the front surface, wherein the outer enclosure members are separated by an outer opening corresponding with the collapsible region of the carbon fiber sheet.

2. The device of claim 1, wherein the computing device is configured to operate in a notebook operating mode and a tablet operating mode.

3. The device of claim 2, wherein the front surface of the carbon fiber sheet includes an upper surface coupled to the display device and a lower surface configured to move away from the display device.

4. The device of claim 3, wherein when placed in the tablet operating mode the carbon fiber sheet folded such that the lower surface of the carbon fiber sheet is immediately adjacent to the base member and the upper surface of the carbon fiber sheet is substantially parallel with the lower surface.

5. The device of claim 2, wherein when in the tablet operating mode the outer enclosure members are adjacent to one another and the display device is substantially parallel to the base member.

6. A collapsible hinge assembly for a computing device comprising:
 a lower housing for receiving input from a user and including a hinge side;
 a unidirectional carbon fiber sheet connected to the hinge side of a base housing associated with the computing device, wherein the unidirectional carbon, fiber sheet includes a coupling surface and a collapsible region;
 a first laminated layer of carbon fiber sheets and a second laminated layer of carbon fiber sheets formed adjacent to the coupling surface of the unidirectional carbon fiber sheet on a first side; and
 a display device formed on a second side of both the first laminated layer of carbon fiber sheets and the second laminated layer of carbon fiber sheets opposite the first side.

7. The assembly of claim 6, wherein the computing device is configured to operate in a notebook operating mode and a tablet operating mode.

8. The assembly of claim 6, wherein the first laminated layer of carbon fiber sheets and the second laminated layer of carbon fiber sheets are separated by a gap corresponding to the collapsible region of the unidirectional carbon fiber sheet.

9. The assembly of claim 6, wherein the first laminated layer of carbon fiber sheets is coupled to the display device and the second laminated layer of carbon fiber sheets are configured to move away from the display device.

10. The assembly of claim 6, wherein when in the tablet operating mode the unidirectional carbon fiber sheet folds onto itself along the collapsible region.

11. The assembly of claim 10, wherein when placed in the tablet operating mode the second laminated layer of carbon fiber sheets are immediately adjacent to the base member and the first layer of carbon fiber sheets are substantially parallel with the second laminated layer of carbon fiber sheets.

12. A dual-mode computing device having a collapsible hinge assembly comprising:
 a base member including a hinge side;
 a unidirectional carbon fiber sheet connected to the hinge side of the base member at a first, end and including a collapsible region, wherein the carbon fiber sheet includes a front surface and a rear surface;
 a pair of outer enclosure members formed on a rear surface of the carbon fiber sheet opposite the front surface, wherein the outer enclosure members are separated by an outer opening along a central region of the carbon fiber sheet; and
 a display device connected to the carbon fiber sheet along the front surface,
 wherein the front surface of the carbon fiber sheet includes an upper surface coupled to the display device and a lower surface configured to move away from the display device;
 wherein the computing device is configured to operate in a notebook operating mode and a tablet operating mode;
 wherein when placed in the tablet operating mode the carbon fiber sheet is configured to fold in an area corresponding to the outer opening such that the lower surface of the carbon fiber sheet is immediately adjacent to the base member and the upper surface of the carbon fiber sheet is substantially parallel with the lower surface.

13. The device of claim 12, wherein when in the tablet operating mode the outer enclosure members are adjacent to one another and the display device is substantially parallel to the base member.

* * * * *

UNITED STATES PATENT AND TRADEMARK OFFICE
CERTIFICATE OF CORRECTION

PATENT NO. : 9,857,847 B2  
APPLICATION NO. : 15/112505  
DATED : January 2, 2018  
INVENTOR(S) : Lim et al.

Page 1 of 1

It is certified that error appears in the above-identified patent and that said Letters Patent is hereby corrected as shown below:

In the Claims

Column 5, Claim 1, Line 37, delete "front," and insert -- front --, therefor.

Column 6, Claim 6, Line 3, delete "carbon," and insert -- carbon --, therefor.

Column 6, Claim 12, Line 38, delete "first," and insert -- first --, therefor.

Signed and Sealed this  
Thirty-first Day of July, 2018

Andrei Iancu  
*Director of the United States Patent and Trademark Office*